Oct. 30, 1951   B. A. RAETSCH ET AL   2,573,488
APPARATUS FOR TESTING ELECTRICAL CONTACTORS
Filed May 15, 1946   4 Sheets-Sheet 1
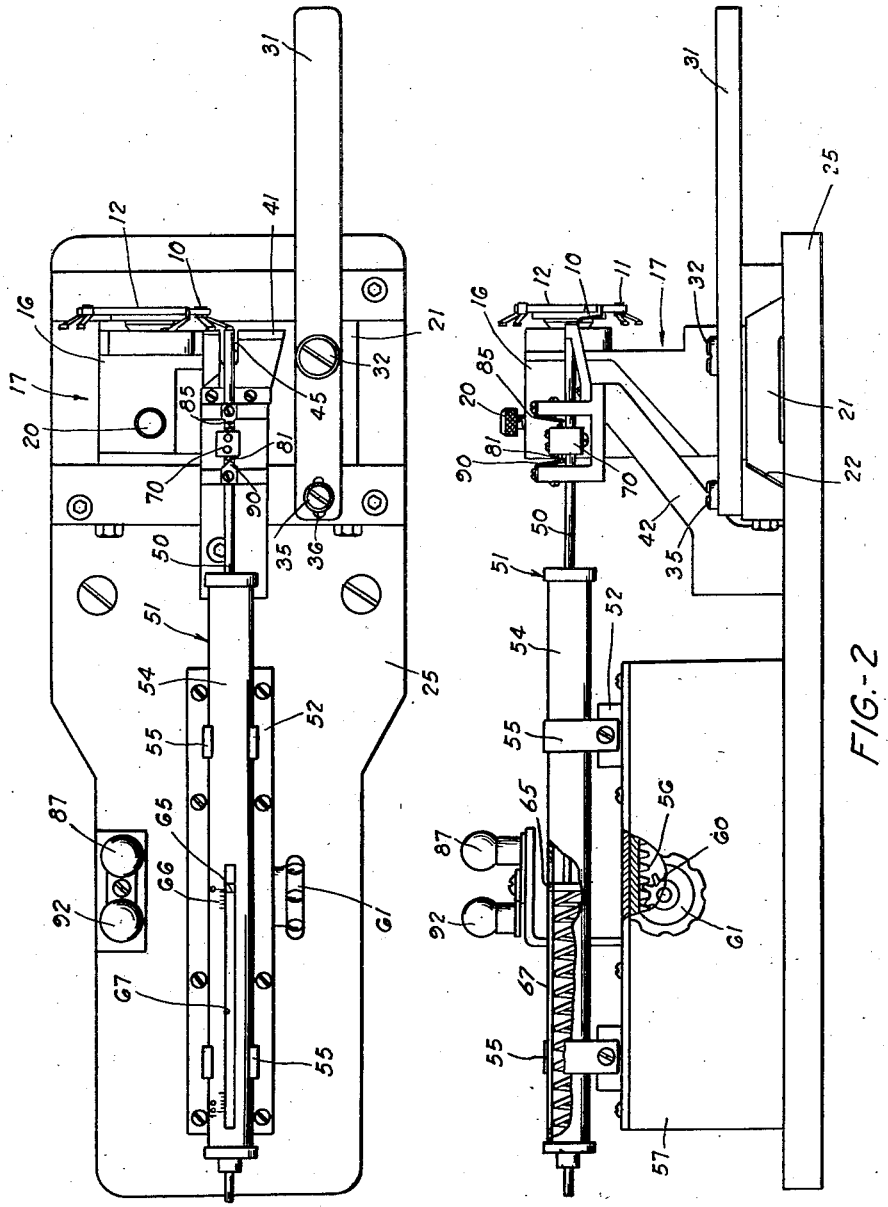
INVENTORS
B. A. RAETSCH
J. A. TRETHEWEY
BY
ATTORNEY

INVENTORS
B. A. RAETSCH
J. A. TRETHEWEY
BY
ATTORNEY

INVENTORS
B. A. RAETSCH
J. A. TRETHEWEY
BY
ATTORNEY

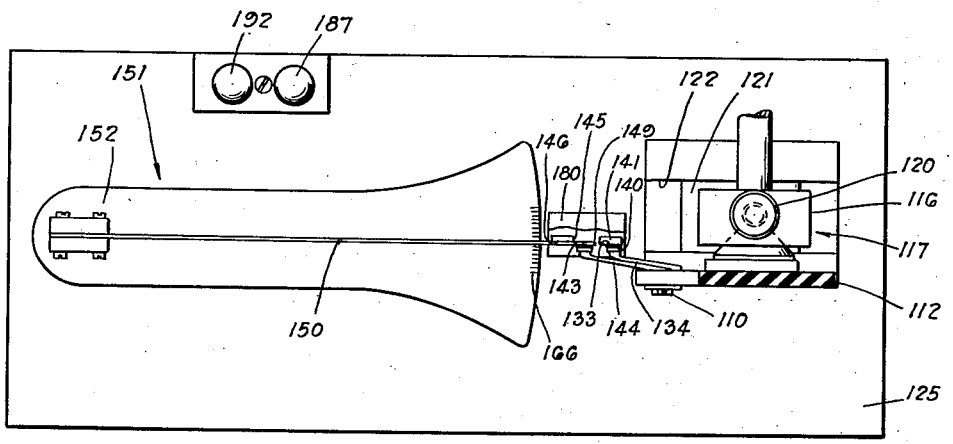
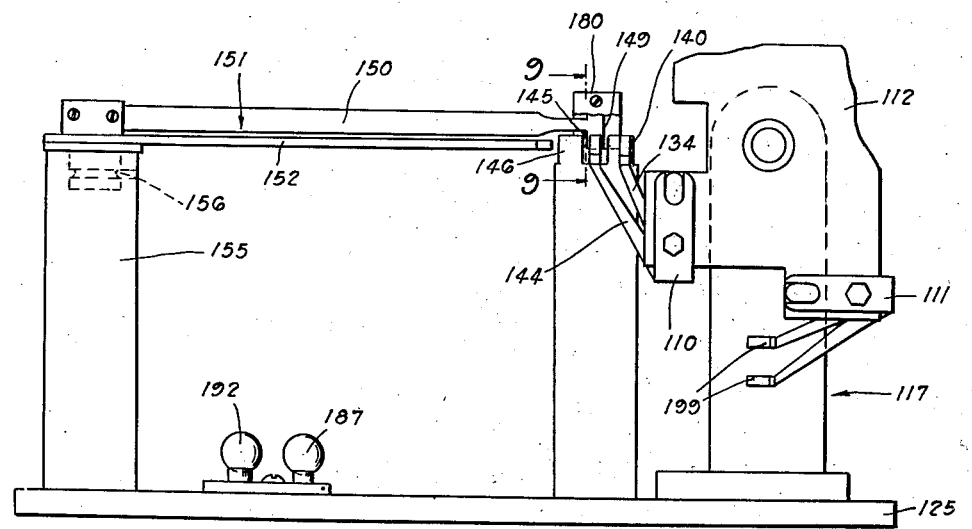
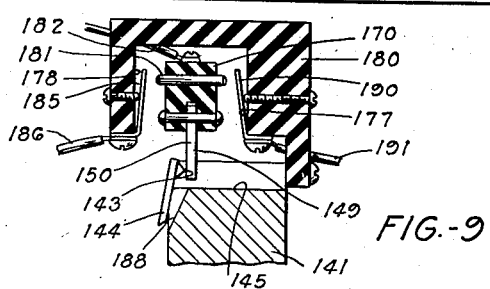

Patented Oct. 30, 1951

2,573,488

UNITED STATES PATENT OFFICE 2,573,488

APPARATUS FOR TESTING ELECTRICAL CONTACTORS

Bruno A. Raetsch, Baltimore, Md., and Jack A. Trethewey, Manitou Springs, Colo., assignors to Western Electric Company, Incorporated, New York, N. Y., a corporation of New York Application May 15, 1946, Serial No. 670,000

5 Claims. (Cl. 73—161)

This invention relates to apparatus for testing electrical contactors, and more particularly to apparatus for testing brushes of potentiometer brush assemblies.

In the manufacture of potentiometers of a type including annular potentiometer cards and a brush assembly including a shaft and brushes having a plurality of fingers for contacting the potentiometer cards, it is important that the pressure between the brush fingers and the potentiometer cards be within predetermined limits. If the pressure between one of the brush fingers and a potentiometer card is too low, the electrical contact between the brush finger and the potentiometer card is not satisfactory. If the pressure between the brush finger and the card is too high, the electrical contact therebetween is good, but the brush finger and the card wear out rapidly during the use of the potentiometer. Hence, it is desirable to check and, if necessary, adjust the potentiometer brush fingers during the manufacture of potentiometers.

An object of the invention is to provide new and improved apparatus for checking electrical contactors.

A further object of the invention is to provide new and improved apparatus for checking the strength of brush fingers of potentiometer brushes during conditions simulating actual operating conditions of such brush fingers.

An apparatus constituting one embodiment of the invention includes a holder for holding a potentiometer brush assembly, which includes a brush provided with two interconnected brush fingers. The holder is movable between two positions, in one of which positions one of the brush fingers engages an abutment, which hold that finger in position similar to its normal operating position in an assembled potentiometer and the other finger is aligned with a spring-loaded plunger of a gauge. The gauge is movable to a position in which the plunger engages and flexes the brush finger in alignment therewith, and the gauge indicates the force applied to that brush finger. If, while a particular force is applied to the brush finger by the plunger of the gauge, the brush finger is forced back too far by the plunger, the plunger closes a switch which lights a light to indicate that the brush finger is not adjusted correctly. If the brush finger resists the movement of the plunger of the gauge too much, it causes the plunger to close a second switch to light a second lamp which indicates that the brush finger is not adjusted correctly. If neither of the switches are closed for the testing tension, the brush finger is in correct adjustment, and the holder is slid to the second position in which position the tested brush finger is moved into engagement with an abutment and the other brush finger is moved simultaneously into alignment with the plunger of the gauge. The operation described hereinabove then is repeated upon the second brush finger to check its adjustment at its normal operating position.

An apparatus forming a further embodiment of the invention includes a slidable holder for mounting a brush assembly including a brush provided with two interconnected brush fingers. A fan gauge having a spring arm may be moved into a position in which the spring arm engages one of the brush fingers, and a stationary abutment engages the other brush finger to place it in a position similar to its normal operating position when the brush assembly is mounted in a potentiometer. If the brush finger engaged by the spring arm of the fan gauge does not resist the spring arm sufficiently when the brush finger is near its normal operating position, the spring arm moves to close a switch to an indicating lamp. If it resists the spring arm too much when the brush finger is near its normal operating position, the spring arm is moved by the brush arm to close a switch to a second indicating lamp. The holder may be slid to its second position preliminary to testing the untested brush finger similarly.

A complete understanding of the invention may be obtained from the following detailed description of apparatus forming specific embodiments thereof, when read in conjunction with the appended drawings, in which:

Fig. 1 is a top plan view of an apparatus forming one embodiment of the invention;

Fig. 2 is a front elevation of the apparatus shown in Fig. 1 with portions thereof broken away;

Fig. 7 is a top plan view of an apparatus constituting an alternative embodiment of the invention;

Fig. 8 is an enlarged, side elevation of the apparatus shown in Fig. 7, and

Fig. 9 is an enlarged, fragmentary section taken along line 9—9 of Fig. 8.

Figure 3:
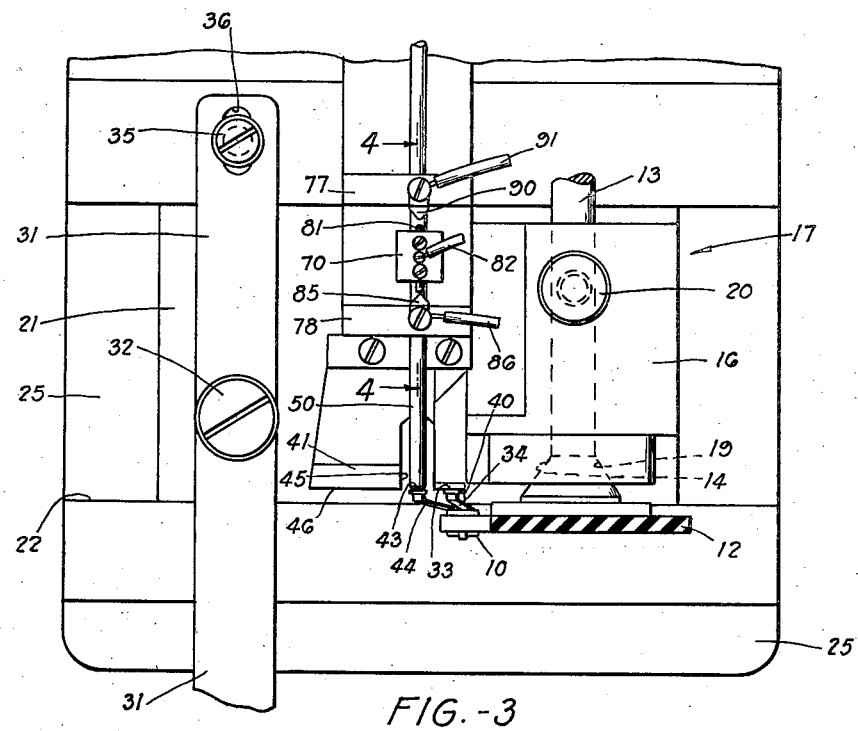
Fig. 3 is an enlarged, fragmentary, top plan view of the apparatus shown in Fig. 1.
Figure 4:
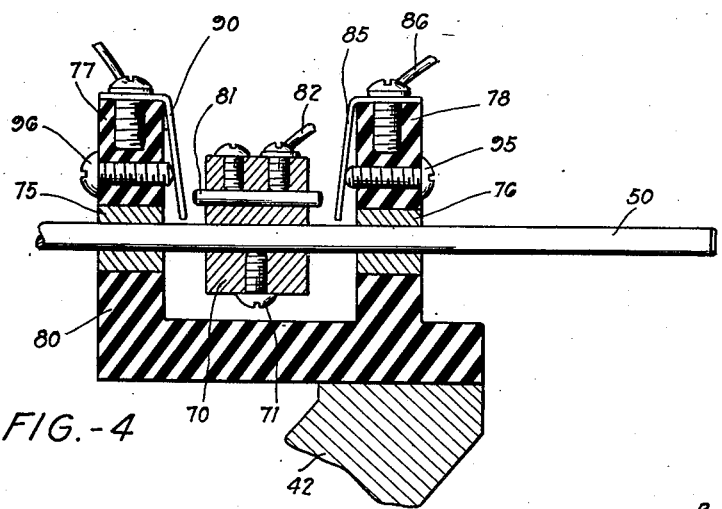
Fig. 4 is an enlarged, fragmentary, vertical section taken along line 4—4 of Fig. 3.

Referring now in detail to the drawings, there is shown in Figs. 1 to 6, inclusive, an apparatus for testing brushes, of which brushes 10 and 11 are shown, of a brush assembly 12. The brush assembly includes a shaft 13 (Fig. 3) having a cone-shaped bearing portion 14, which engages a cone-shaped thrust bearing of a potentiometer housing (not shown) to accurately position the brush assembly with respect to the housing when the brush assembly is assembled therewith. In testing the brush assembly 12, the shaft 13 is positioned in a bearing 16 of a holder 17, and is held by a set screw 20 in a position in which the bearing portion 14 of the shaft engages a complementary thrust bearing portion 19 of the bearing 16.

The holder 17 includes a dove-tailed carriage 21 (Fig. 6) slidable along a guideway 22 of a base 25 of the apparatus. A handle 31 fastened pivotally to the dove-tailed carriage 21 by a pin 32 is connected to the base 25 by a pin 35, which extends through a slot 36 formed in the handle 31 and is fastened to the base 25. The handle may be moved to position the holder 17 in a position in which a contacting tip 33 of a brush finger 34 of the brush 10 engages a face 40 of an abutment 41 mounted on a support 42 fastened rigidly to the base 25. The face 40 of the abutment 41 is positioned in such a relationship with respect to the thrust bearing portion 19 of the bearing 16 (Fig. 3) that when the brush assembly 12 is held in a position in which the bearing portion 14 of the shaft 13 engages the bearing portion 19 and the tip 33 engages the abutment face 40, the brush finger 34 is approximately in its normal operating position. That is, the brush finger 34 is in substantially the same position as that in which it is in when it engages a potentiometer card (not shown) when the brush assembly 12 is assembled in the potentiometer (not shown) for which it is designed. In this position of the holder 17, a contacting tip 43 of a brush finger 44 of the brush 10 is opposite to a slot 45 formed in the abutment 41. The fingers 34 and 44 are interconnected so that force applied to one affects the other. The handle may be moved to move the holder to a position in which the tip 43 of the brush finger 44 engages a face 46 of the abutment 41, which holds the brush finger 44 approximately in its normal operating position, and the tip 33 of the brush finger 34 is in a position opposite to the slot 45 in the abutment 41.

A spring-loaded plunger 50 (Fig. 1) is aligned with the slot 45 in the abutment 41 and forms part of a gauge 51, which also includes a housing 54 fastened rigidly to the carriage 52 by clamps 55—55. The carriage 52 includes a rack 56 (Fig. 2), and is mounted slidably in a guideway 57 fastened rigidly to the base 25. A pinion 60, which is rotatable by a manually operable knob 61, meshes with the rack 56. To test the brush finger 44, when the holder 17 is in the position shown in Figs. 1 and 2, the knob 61 is turned in a direction which advances the carriage 52 toward the right, as viewed in Fig. 2. The right end of the plunger 50 engages the tip 43 of the brush finger 44, and the movement of the plunger toward the right is retarded by the brush finger 44 in proportion to the adjustment of the brush finger 44. The plunger is urged toward the right, as viewed in Fig. 1, by a compression spring (not shown) enclosed in the housing 54 of the gauge 51. A pointer 65 fastened to the plunger 50 movable along a slot 67 formed in the housing 54 indicates on a scale 66 formed on the housing 54 the force exerted upon the right end of the plunger 50 by the brush finger 44. The gauge 51 is moved to the right until the pointer 65 indicates on the scale 66 that the brush finger 44 is under a predetermined testing flexure.

A collar 70 (Fig. 4) composed of electrical insulating material is fastened to the plunger 50 by a set screw 71. The plunger 50 is mounted slidably in bushings 75 and 76 mounted in arms 77 and 78, respectively, of a bracket 80 composed of electrical insulating material. A contactor 81 carried by the collar 70 and connected electrically by a conductor 82 to a source of electrical current (not shown) is carried by the plunger 50 into engagement with a contact 85 connected by a conductor 86 to a lamp 87 (Figs. 1 and 2) if the brush finger 44 has been moved beyond a predetermined allowable distance in placing it under the testing flexure. The lamp 87 is connected to the source of current and is lighted when the contactor 81 engages the contact 85. If, after the gauge 51 is moved to a position in which the pointer 65 indicates on the scale 66 that the brush finger is under the proper testing flexure, the contactor 81 contacts the contact 85, an operator of the apparatus will be apprised by the lighting of the lamp 87 of the fact that the brush arm 11 does not have sufficient reactive force when near its normal operating position.

A contact 90 (Fig. 4) mounted on the arm 77 of the bracket 78 is connected by a conductor 91 (Fig. 4) to a lamp 92 (Figs. 1 and 2). If the brush finger 44 has too great reactive force when near its normal operating position, it will retard movement of the plunger 50 toward the right, as viewed in Fig. 1, to such an extent that when the brush finger 44 is subjected to the testing force, as indicated by the reading of the pointer 65 on the scale 66, the contactor 81 (Fig. 4) will engage the contact 90 and the lamp 92 (Fig. 1) will be lighted, which fact will indicate to the operator of the apparatus that the brush finger 44 has too great a reactive force. The contact 85 (Fig. 4) is positioned correctly by an adjustment screw 95, and the contact 90 is similarly positioned by an adjustment screw 96.

After testing the brush finger 44, it may be bent, if necessary, so that it has the desired reactive force when near its normal operating position and then may be retested. If neither the lamp 87 nor the lamp 92 is lighted when the reading of the pointer 65 on the scale 66 is correct, the reactive or contacting force of the brush finger 44 when near its normal operating position is within allowable limits. The length of the contactor 81 with respect to the distance between the contacts 85 and 90 (Fig. 4) is such that the contactor 81 will not contact either the contact 85 or the contact 90 if the position of the brush finger being engaged by the plunger 50 is within allowable limits.

After the brush finger 44 has been tested, and corrected if necessary, so that it is known to be satisfactory, the handle 31 is moved so as to move the carriage 21 and the holder 17 to positions in which the contacting tip 33 of the brush finger 34 is opposite to the slot 45 in the abutment 41 and the contacting tip 43 of the brush finger 44 engages the face 46 of the abutment 41 in approximately its normal operating position. Thus, the adjustment of the brush finger 44 will not affect the testing of the brush finger 34. The brush finger 34 then may be tested, and may be adjusted, if necessary, in the same manner as that described hereinabove in the testing of the brush finger 44.

*Operation of embodiment shown in Figs. 1 to 6*

In the operation of the apparatus described hereinabove, the brush assembly 12 is mounted in the holder 17 (Fig. 3) as described hereinabove. The handle 31 is moved to position the tip 33 of the brush finger 34 in engagement with the face 40 of the abutment 41, and moves the tip 43 of the brush finger 44 into alignment with the slot 45 formed in the abutment 41. The knob 61 (Fig. 2) then is turned and the gauge 51 is moved toward the right, as viewed in Fig. 2. The tip 43 of the brush finger 44 is engaged by the plunger 50 and resists the movement of the plunger 50 so that the pointer 65 (Fig. 1) fastened to the plunger 50 is moved to the left, as viewed in Fig. 1, relative to the housing 54 of the gauge 51.

When the brush finger 44 is placed under the proper testing flexure, as indicated by the reading of the pointer 65 on the scale 66, if the brush finger 44 is adjusted correctly, the contactor 81 (Fig. 4) will not be in engagement with either the contact 85 or the contact 90 so that neither the lamp 87 nor the lamp 92 (Fig. 1) will be lighted, which fact indicates to the operator that the brush finger 44 is satisfactory. If the brush finger 44 does not have sufficient contacting force when near its normal operating position, under the testing flexure, the plunger 50 will be in such a position that the contactor 81 engages the contact 85 (Fig. 4) and the lamp 87 will be lighted. Conversely, if the brush finger 44 has too great a contacting force when near its normal operating position, when it is placed under the testing flexure, the lamp 92 will be lighted from engagement between the contactor 81 (Fig. 4) and the contact 90.

After the brush finger 44 has been adjusted, if adjustment thereof is necessary, it is retested. If the brush finger 44 then is satisfactory, the handle 31 is actuated to move the tip 43 of the brush finger 44 into engagement with the face 46 of the abutment 41, and moves the tip 33 of the brush finger 34 into alignment with the slot 45 in the abutment 41. The brush finger 34 then is tested while the brush finger 44 is held in its normal operating position by the abutment 41 and the holder 17, and is adjusted if necessary.

Figure 5:
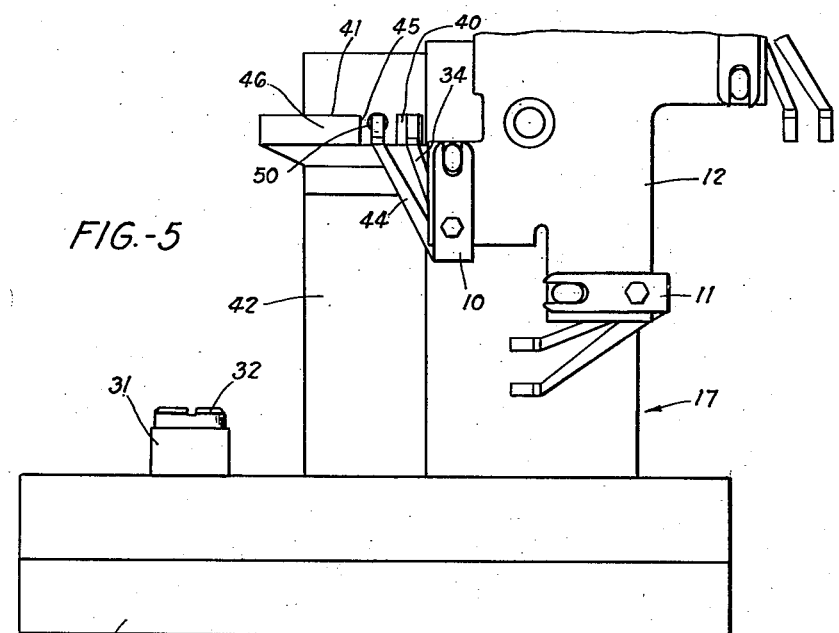
Fig. 5 is an enlarged, side elevation of the apparatus shown in Fig. 1.
Figure 6:
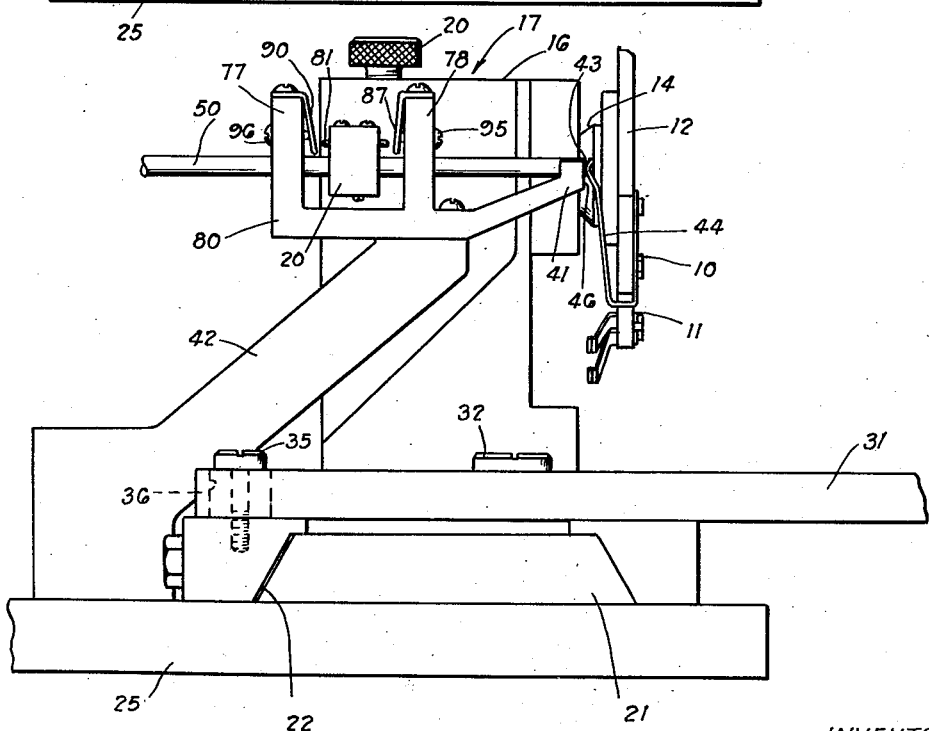
Fig. 6 is an enlarged, fragmentary, front elevation of the apparatus shown in Fig. 1.

After testing the brush 10, the set screw 20 is unscrewed, the brush assembly 12 is rotated 90° in a clockwise direction, as viewed in Fig. 5, and the set screw is retightened. The brush 11 then may be tested similarly to the test of the brush 10. The length of movement of the holder 17 relative to the abutment 41 and the length of the faces 40 and 46 are such that brushes having tips thereof spaced farther apart or closer together than the tips 33 and 43 are may be tested.

The apparatus described hereinabove serves to individually test the adjustment of each of the brush fingers 34 and 44 of the brush 10 while the other brush finger is substantially in its normal operating position so that the adjustment of the brush finger not being tested does not affect the test of the brush finger being tested. This apparatus indicates whether the positions of the brush fingers are within allowable limits when they are flexed sufficiently to have correct contacting forces.

*Alternative embodiment (Figs. 7, 8 and 9)*

An apparatus forming a further embodiment of the invention, as shown in Figs. 7, 8 and 9, is designed to test brushes, illustrated by brushes 110 and 111, of a brush assembly 112, which is identical with the brush assembly 12 (Fig. 5), and includes a bearing 116 (Fig. 7) of a holder 117. The bearing 116 is identical with the bearing 16 (Fig. 2), and includes a set screw 120. The brush assembly 112 may be held securely by the holder 117, which is mounted on a carriage 121 mounted slidably in a guideway 122 of a base 125.

A face 140 of an abutment 141 is separated by a slot 145 in the abutment from a face 146 of the abutment 141. A tip 149 of a spring arm 150 of a fan gauge 151 is movable in the slot 145 in the abutment 141. The left end of the spring arm 150, as viewed in Fig. 7, is fastened rigidly to the body portion 152 of the fan gauge 151, which is pivotally mounted on a post 155 by a pin 156. The gauge 151 may be moved in a clockwise direction, as viewed in Fig. 7, to move the tip 149 of the spring arm 150 into engagement with a tip 143 of a brush finger 144 of the brush 111. The body portion 152 is moved further until the reading of the spring arm 150 on a scale 166 formed on the body portion 152 of the gauge 151 indicates that the brush finger 144 is flexed as desired for testing. Meanwhile, the face 140 of the abutment 141 is engaged by a tip 133 of a brush finger 134 of the brush 110, and holds the brush finger 134 in approximately its normal operating position.

If the brush finger 144 has too low a contacting force when it is near its normal operating position and is placed under testing flexure it is moved too far and a contactor 181 (Fig. 9) carried by a collar 170 composed of electrical insulating material and fastened to the upper portion of the tip 149 of the spring arm 150 engages a contact 185 mounted on an arm 178 of a bracket 180 composed of electrical insulating material. The contact 185 is connected by a conductor 186 to a lamp 187 (Fig. 8), which is connected to a source of electrical current (not shown), and the contactor 181 is connected by a conductor 182 to that source of electrical current. Hence, the lamp 187 is lighted, which indicates that the brush finger 144 is moved too far from its normal operating position when it is placed under the testing flexure.

If the brush finger 144 has too great a contacting force when near its normal operating position, when the gauge 151 applies testing flexure to the brush finger 144, the brush finger 144 presses the spring arm 150 to a position in which the contactor 181 (Fig. 9) engages a contact 190, which is connected by a conductor 191 to a lamp 192 (Fig. 8) and is mounted on an arm 177 of the bracket 180. A notch 188 formed in the abutment 141 provides clearance for such movement of the brush finger 144. The lamp 192 is connected to the source of electrical current to which the contactor 181 is connected so that the lamp 192 is lighted when the contactor 181 engages the contact 190. Lighting of the lamp 192 indicates that contacting force of the brush finger 144 would be too strong when near its normal operating position.

After the brush finger 144 has been tested, and adjusted, if necessary, the carriage 121 (Fig. 1) is moved to a position in which the face 146 of the abutment 141 is engaged by the tip 143 of the brush finger 144 and holds it in its normal operating position, and the tip 149 of the spring arm 150 engages the tip 133 of the brush finger 134, and the brush finger 134 is tested.

Operation of alternative embodiment

In the operation of the apparatus shown in Figs. 7, 8 and 9, the brush assembly 112 is mounted in the holder 117. The carriage 120 of the holder 117 is moved to a position in which the face 140 of the abutment 141 is engaged by the tip 133 of the brush finger 134, and holds it approximately in its normal operating position. The body portion 152 of the gauge 151 is moved in a clockwise direction, as viewed in Fig. 7, and the tip 149 of the spring arm 150 engages the tip 143 of the brush finger 144, which resists movement of the spring arm 150 and moves the spring arm 150 relative to a scale 166 on the body portion 152 of the gauge 151. After the brush finger 134 has been tested, and adjusted if necessary, the carriage 121 then is slid along the guideway 122 to a position in which the face 146 of the abutment 141 is engaged by the tip 143 of the brush finger 144 and holds it approximately in its normal operating position. The body portion 152 of the gauge is swung in a clockwise direction, as viewed in Fig. 7, which moves the tip 149 of the spring arm 150 against the tip 133 of the brush finger 134, and the brush finger 134 is tested similarly to the testing of the brush finger 144.

The set screw 120 is loosened after the brush 110 is tested, and the brush assembly is rotated relative to the holder 117 to a position in which the brush 111 is in a position to be tested. The set screw 120 then is actuated to lock the brush assembly 112 to the holder 117 in this position. The brush 111 then is tested. Tips 199—199 of the brush 111 are spaced farther apart than the tips 133 and 143 of the brush 110. However, the holder 117 may be moved between far enough limits to position each of the tips 199—199 opposite to the slot 145 in the abutment 141, and the abutment faces 140 and 146 are sufficiently long to contact each brush finger not being tested.

The apparatus shown in Figs. 7, 8 and 9 tests the brushes of the brush assembly 112 accurately and may be easily operated. Each of the brush fingers of each brush is individually tested while the other brush finger is approximately in its normal operating position. Hence, the adjustment of the brush finger, which is not being tested, does not affect the test of the brush finger under test.

What is claimed is:

1. An apparatus for testing electrical contactors, which comprises a gauge having a spring-loaded plunger and means for indicating the amount of any force applied to the end of the plunger, a carriage for moving the gauge in a direction along the axis of the plunger, an abutment having therein an opening for providing a passage for the plunger, a holder for holding an electrical contactor having a plurality of fingers, a carriage rigidly secured to the holder and movable transversely with respect to the plunger of the gauge for selectively positioning one of the fingers of the contactor in alignment with the opening in the abutment and for selectively positioning the other finger in a position engaging the abutment, and means operable by the plunger for indicating whether the finger in alignment with the opening in the abutment is satisfactory when the plunger applies a predetermined amount of force to that finger.

2. An apparatus for testing potentiometer brush assemblies, which comprises a pair of fixed abutments having an opening therebetween and also being provided with abutment faces lying in a single plane, a holder positioned a predetermined distance in front of the abutments for clamping a shaft of a brush assembly having a brush, means for selectively moving the holder between two positions in directions parallel to the faces of the abutments, said holder when in one of said positions serving to position a tip of one of a pair of brush fingers of the brush against the face of one of the abutments and to position a tip of the other brush finger at the opening between the abutments, said holder when in the other position serving to position the tip of the last-mentioned brush finger against the face of the other abutment and the tip of the other brush finger at the opening between the abutments, a spring-loaded plunger mounted perpendicularly to said faces of the abutments and positioned in alignment with the opening between the abutments, means for moving the plunger into the opening to engage the brush finger at the opening, means for indicating the amount of force applied to the plunger, and means for indicating the position of the plunger when a predetermined amount of force is applied thereto.

3. An apparatus for testing potentiometer brush assemblies, which comprises a pair of fixed abutments having an opening therebetween and also being provided with abutment faces lying in a single plane, a holder positioned a predetermined distance in front of the abutments for clamping a shaft of a brush assembly having a brush, means for selectively moving the holder between two positions in directions parallel to the faces of the abutments, said holder when in one of said positions serving to position a tip of one of a pair of brush fingers of the brush against the face of one of the abutments and to position a tip of the other brush finger at the opening between the abutments, said holder when in the other position serving to position the tip of the last-mentioned brush finger against the face of the other abutment and the tip of the other brush finger at the opening between the abutments, a spring-loaded plunger mounted perpendicularly to said faces of the abutments and positioned in alignment with the opening between the abutments, means for moving the end of the plunger through the opening to engage the brush finger at the opening, means for indicating the amount of force applied to the plunger, a lamp, a second lamp, a contactor of a predetermined length carried by the plunger, and a pair of stationary contacts spaced a predetermined distance apart and bracketing the contactor, one of said contacts being connected electrically to one of said lamps so that the lamp is lighted when that contact is engaged by the plunger, the other contact being connected electrically to the other lamp so that that lamp is lighted when the last-mentioned contact is engaged by the contactor.

4. An apparatus for testing electrical contactors, which comprises means for holding a resilient electrical contactor, an abutment having an opening therein, a gauge having a rigid body portion and a resiliently urged contacting element movable in the opening in the abutment, means for mounting the gauge for movement toward the contactor-holding means, means for mounting the contactor-holding means for movement relative to the abutment, said contactor-holding means when in one position serving to hold the electrical contactor in a position in which one of a pair of fingers thereof is engaged by the abutment and the other finger thereof may be engaged by the contacting element of the gauge, said contactor-holding means when in a second position serving to hold the electrical contactor in a position in which the last-mentioned finger thereof is engaged by the abutment and the other finger thereof is engaged by the contacting element of the gauge, and means for indicating displacement of one of the fingers when that finger is placed under a predetermined flexure by the gauge.

5. An apparatus for testing electrical contactors, which comprises means for holding a resilient electrical contactor, an abutment having an opening therein, a fan gauge having a rigid body portion and a resiliently urged contacting element movable in the opening in the abutment, means for mounting the fan gauge for pivotal movement toward the contactor-holding means, means for mounting the contactor-holding means for movement relative to the abutment, said contactor-holding means when in one position serving to hold the electrical contactor in a position in which one of a pair of fingers thereof is engaged by the abutment and the other finger thereof is engaged by the contacting element of the fan gauge, said contactor-holding means when in a second position serving to hold the electrical contactor in a position in which the last-mentioned finger thereof is engaged by the abutment and the other finger thereof is engaged by the contacting element of the gauge, and means for indicating displacement of one of the fingers when that finger is placed under a predetermined flexure by the gauge.

BRUNO A. RAETSCH.
JACK A. TRETHEWEY.

REFERENCES CITED

The following references are of record in the file of this patent:

UNITED STATES PATENTS

| Number | Name | Date |
|---|---|---|
| 985,213 | Shigley | Feb. 28, 1911 |
| 1,565,577 | McDonough | Dec. 15, 1925 |
| 2,003,910 | Stephenson | Jan. 4, 1935 |
| 2,077,510 | Boehler et al. | Apr. 20, 1937 |
| 2,200,348 | Summers | May 14, 1940 |
| 2,285,166 | Malhiot | June 2, 1942 |
| 2,338,826 | Summers | Jan. 11, 1944 |
| 2,355,468 | Robb | Aug. 8, 1944 |